Dec. 8, 1942. L. H. HILL Re. 22,233

VOLTAGE REGULATOR

Original Filed Jan. 15, 1941 3 Sheets-Sheet 1

Inventor
L. H. Hill
by Harold S. Silver
Attorney

Dec. 8, 1942. L. H. HILL Re. 22,233

VOLTAGE REGULATOR

Original Filed Jan. 15, 1941 3 Sheets-Sheet 2

Inventor
L. H. Hill
by Harold S. Silver
Attorney

Dec. 8, 1942. L. H. HILL Re. 22,233

VOLTAGE REGULATOR

Original Filed Jan. 15, 1941 3 Sheets-Sheet 3

Inventor
L. H. Hill
by Harold S. Silver
Attorney

Reissued Dec. 8, 1942

Re. 22,233

UNITED STATES PATENT OFFICE 22,233

VOLTAGE REGULATOR

Leland H. Hill, Wauwatosa, Wis., assignor to Allis-Chalmers Manufacturing Company, Milwaukee, Wis., a corporation of Delaware Original No. 2,278,261, dated March 31, 1942, Serial No. 374,433, January 15, 1941. Application for reissue September 3, 1942, Serial No. 457,203

13 Claims. (Cl. 171—119)

This invention relates in general to voltage regulators and control systems therefor and relates particularly to regulators in which two inductively related windings are utilized to add or subtract a voltage to or from a circuit and in which such added or subtracted voltage is automatically varied by an electromechanical operator.

In prior art regulating apparatus of the above type, where one winding is connected across a circuit and the other winding is connected to add or subtract a variable voltage to or from such circuit, the maximum safe current value of at least one of the windings, is a limiting factor of the apparatus. Such apparatus, when regulating the voltage of a load circuit to a predetermined value independent of changes in the supply voltage, is designed for a limited range of supply voltage variation within which the desired regulation of the load voltages will be maintained. In these prior art regulators, limiting devices were applied which prevented movement of the regulator beyond the point at which the maximum safe current value in the windings was obtained.

It has been found desirable to provide for an increase in the permissible safe load current in voltage regulator windings in order to avoid addition of another regulator to take care of increased load on the regulated circuit. Some prior art induction regulators utilize a two-part series connected winding, the sections of which may be reconnected in multiple, thereby doubling the permissible maximum safe load current but halving the range of regulation.

It is desirable to have an adjustment available without the necessity of disconnecting and reconnecting the regulator windings, thereby necessitating discontinuance of service by the regulator. It is also desirable to utilize a small increase in maximum safe current value with an accompanying small decrease in regulating range.

It has been found that such adjustment can be obtained by adjusting the action of the limiting means of the regulator operator. By utilizing a simple mechanical adjustment, easily available on the outside of the regulator, indication of the maximum safe current setting and the supply voltage range can also be obtained. Also by using a simple mechanical adjustment such adjustment can easily be made responsive to the load current or to the winding oil temperature or to a combination of both.

It is therefore an object of the present invention to provide a regulator and control system and apparatus therefor which utilizes any or all of the above advantages, and avoids any or all of the above disadvantages of the prior art regulators.

It is also an object of this invention to provide an adjustable limiting means for a regulator operator, such as is shown in the drawings and described herein, whereby changes in the maximum safe current value of the regulator windings may be simply and easily effected either manually or in response to given conditions.

Other objects and advantages of the invention will be apparent from the following description when read in connection with the accompanying drawings, in which.

Figures 1, 10:
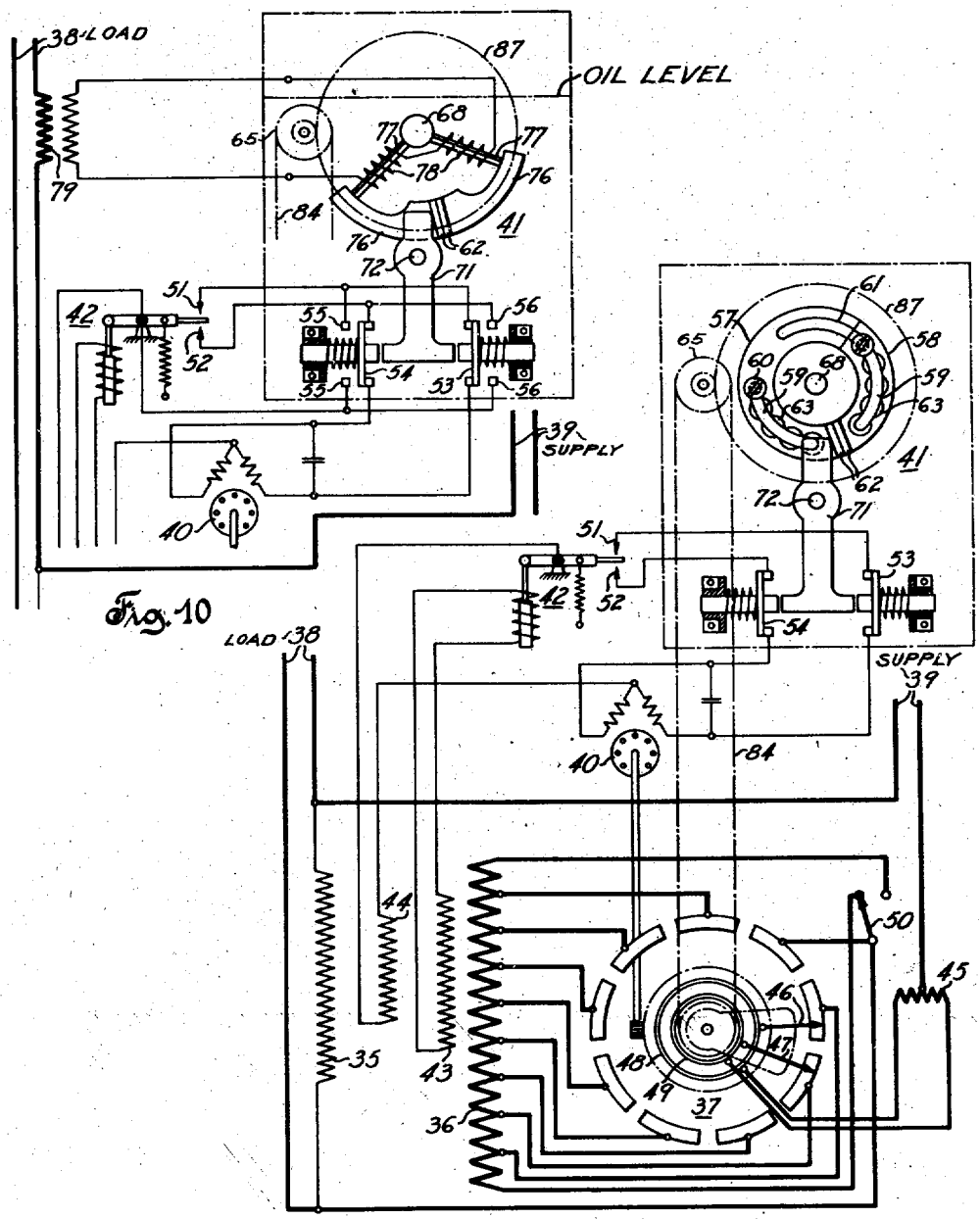
Fig. 1 is a schematic diagram of a regulating system embodying the present invention.
Fig. 10 is a schematic diagram showing a modified form of the invention shown in Fig. 1.

As shown in Fig. 1, a load circuit 38 has its voltage regulated to a predetermined value independent of changes in the voltage of a supply circuit 39, by means of the two inductively related windings 35 and 36. For convenience, the regulator is shown as a step regulator, however, the system is as applicable to an induction regulator or to any other type of regulator involving two induction windings, one of which, such as 35, is an exciting winding and is connected across the circuit and the other, such as 36, is a series winding and is connected so as to add or subtract a voltage to or from the circuit.

The turns of the series winding 36 connected into the circuit, are varied in number by the dial switch, shown generally at 37, and in direction by the reversing switch 50. These switches are operated by means of a motor 40 energized from a winding 44 and controlled by a primary relay shown generally at 42, which is responsive to the voltage across the load circuit 38. The coil of the primary relay 42 is shown connected to a winding 43 which with the winding 44 is inductively related to the shunt or exciting winding 35.

The motor may be operated to raise or lower the voltage with any suitable prior art time delayed control, for example, as shown in my prior United States Patent 2,177,109, dated October 24, 1939. Limit switches shown generally at 41 are provided to break the circuits to the motor 40 at either extreme position of the regulator. The limit switch operator 71 has a pivotal movement about a stub shaft 72 to operate either limit switch 53 or 54. Movement of the operator 71 is caused by adjustable members 57 or 58 which are adjustably affixed to rotate with the position indicator shaft 68. The position indicator shaft 68 is driven from the shaft of the dial switch 37 by any suitable means such as a chain 84.

The limit switch and position indicator structure is shown more clearly in Figs. 2 to 7, inclusive. A shaft 64 has bearings in an insulating frame member 66 and a metal frame member 73. A sprocket 65 is pinned to the shaft 64 and is driven from the dial switch 37 by the chain 84. A pinion 67 pinned to the shaft 64 drives a gear 69 pinned to the position indicator shaft 68. A pointer 70 is pinned to the shaft 68 and acts in conjunction with a scale 74 to indicate the position of the dial switch movable contacts 46 and 47. The scale 74 may be supported on the frame member 73 as by the bolts 85. On the other end of the shaft 68 is a hub 86 pinned to the shaft 68 so as to rotate therewith.

The hub 86 supports the members 57 and 58 which, as shown in Figs. 4, 5, 6 and 7, are provided with curved slots 59 so that these members are angularly adjustable about the shaft 68. These members 57 and 58 have upturned ends 62 which cooperate with the upper end of the limit switch operator 71 to move the same about its pivot 72. The member 57 also has a guiding slot 61 and these members are clamped by means of cap screws 60 in any one of five positions relative to the hub 86.

Figure 2:
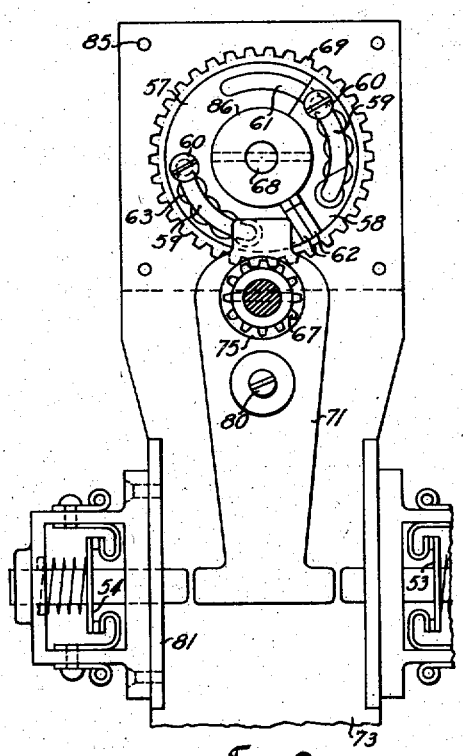
Fig. 2 is a front elevation of a limit switch and position indicator construction which may be utilized in the regulating system of Fig. 1.
Figure 8:
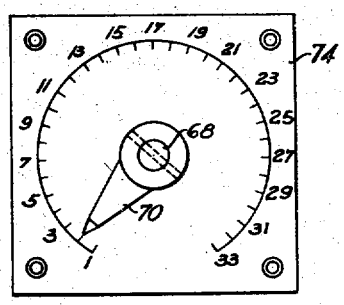
Figs. 4, 5, 6, 7 and 8 are detail views of various elements of the regulating apparatus shown in Figs. 2 and 3.
Figure 4:
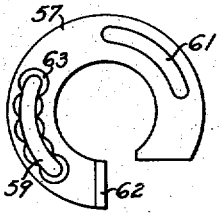
Figure 5:
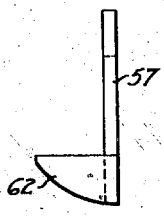
Figure 6:
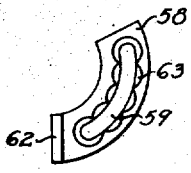
Figure 7:
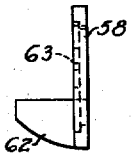

With the apparatus in the position shown in Fig. 2, which is the position of the dial switch shown in Fig. 1 and indicated in Fig. 8, movement of the regulator to the number 1 position will cause a clockwise movement of the shaft 68 as viewed in Fig. 2. Movement of this shaft will cause the upturned end 62 of the adjustable member 57 to move the upper end of the operator 71 toward the left as viewed in Fig. 2, thus opening the motor energizing circuit by operation of the limit switch 53. As a space saving measure, the shaft 64 rotates in a hole 75 in the operator 71 which is large enough to permit operating movement of the operator 71 about its pivot 72. A cap screw 80 holds the operator 71 on the shaft 72.

The winding 35 is designed for a predetermined maximum safe current value which, for example, may be 200 amperes. The winding 36 is designed for double this value. If it is desired to utilize this regulator on an increased load of double the original load, that is, 400 amperes, it is merely necessary to loosen the cap screws 60 and move the adjustable member 58 in a counterclockwise direction and the member 57 in a clockwise direction and reseat the cap screws 70 in the holes 63 in the opposite ends of the slots 59. This adjustment will set the limit switches 53 and 54 for operation so that the range of movement of the dial switch 37 is cut down fifty percent.

In any inductively related windings, the ampere turns of the primary winding are equal to the ampere turns of the secondary winding. By decreasing the regulating range, that is, by decreasing the number of turns of the winding 36, available for regulation, to one-half, the current therein may be doubled and the number of ampere turns therein maintained constant, but with a doubled current value. If the ampere turns in winding 36 are maintained constant, the ampere turns of winding 35 are similarly maintained constant and as the number of turns is not varied, the current therein will remain within the designed maximum safe current value.

This change can be easily and simply made without taking the regulator out of service, as would be necessary if the winding connections were to be changed. It also permits increasing the current rating of the regulator in small steps with consequent small decrease in regulating range. Often the increase in system load, necessitating an increase in regulator current rating, may be only 10 to 30% and if this can be effected with only a 10 to 30% decrease in regulating range, better regulation can be obtained.

The limit switch adjustment is shown as having five positions, that is, five different holes 63 in which the cap screws 60 may be seated. These positions as shown would correspond to permissible current ratings (in the example above given) of 200, 229, 267, 320 and 400 amperes and corresponding regulating ranges of ±10%, ±8¾%, ±7½%, ±6¼%, and ±5%. A greater number of positions may be had by increasing the number of holes 63, with a consequent finer adjustment of current ratings and regulating range. The above figures and the number of steps shown in the drawing are merely examples of conditions and adjustments that have been found desirable.

Figure 3:
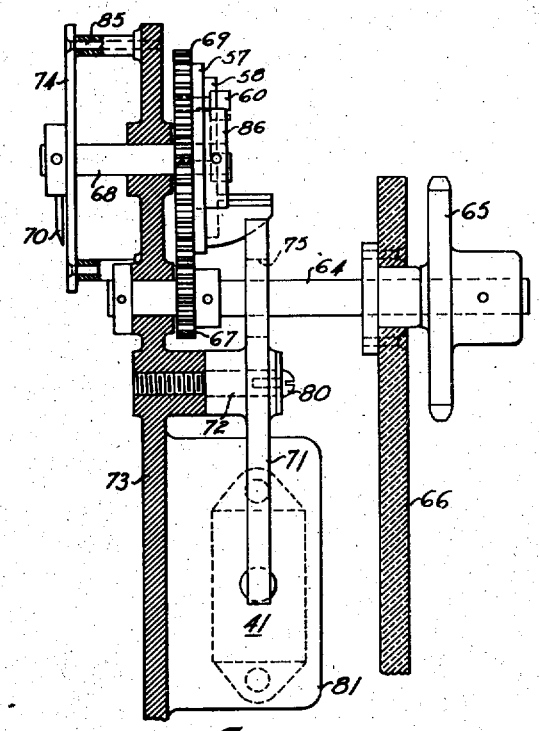
Fig. 3 is an end view of the structure in Fig. 2.
Figure 11:
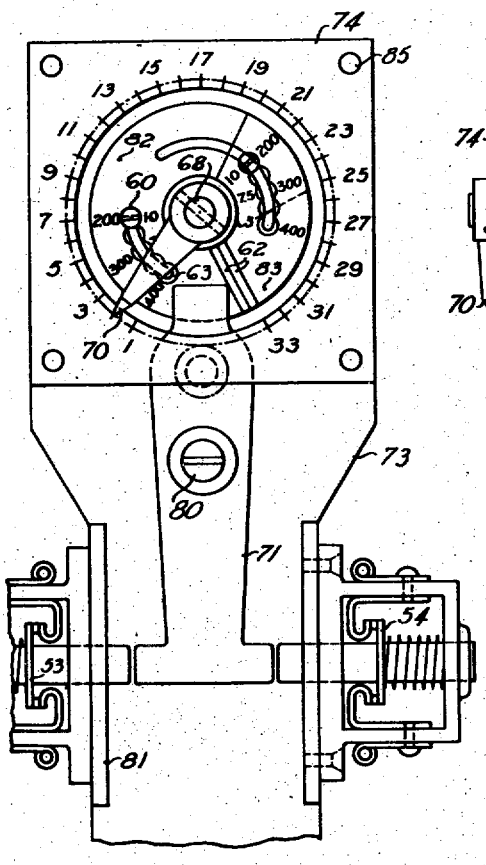
Figs. 9 and 11 are front and end elevational views of a modified form of the invention shown in Figs. 2 and 3.
Figure 9:
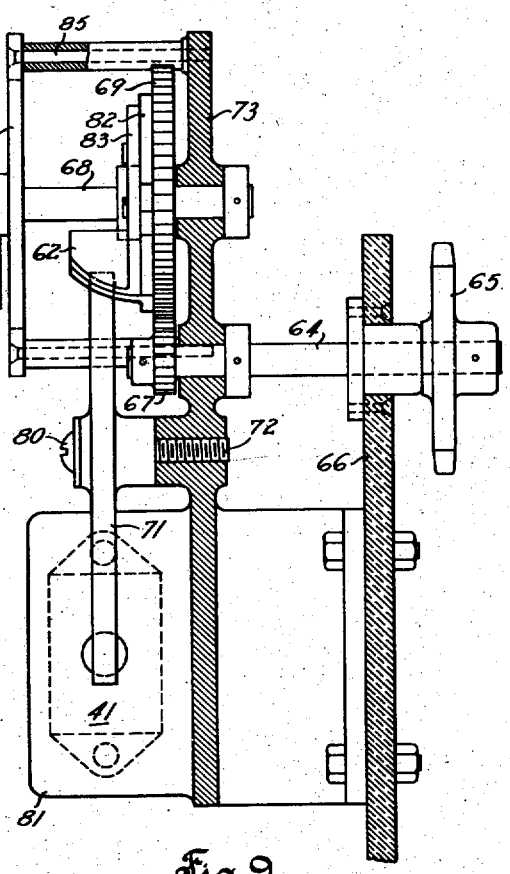

In Figs. 9 and 11, a modification of the structure shown in Figs. 2 and 3 is illustrated whereby the adjustment of the limit switches can be made from the front of the regulator mechanism rather than from the back. In the modified structure of Figs. 9 and 11, an indication of the current rating and regulation range setting of the limit switch adjustment is readily available.

The above is obtained by cutting away a circular section from the position indicator scale 74 so that the position of the adjustable limit switch members 57 and 58 can readily be seen. As shown in Fig. 11, these members may have scale markings thereon of maximum safe current value such as 200, 300 and 400 and accompanying markings of 10, 7.5 and 5 depicting the range setting of the limit switches. The cap screws 60 may have a distinguishing color and will indicate the position of the adjustable members. The cap screws 60 may easily be reached through the position indicator scale 74 by means of a screw driver, and the adjustment made from the front of the regulator.

In the construction above described, manual adjustment of the limit switches has been contemplated, perhaps as a result of an alarm showing overloading of the regulator windings. In Fig. 10 a modification of this construction is shown whereby the adjustment of members 76 may be made responsive to the load current. The members 76 are illustrated as being guided for movement on a circle 87 by action of bimetallic members 77 which are affixed to the shaft 68. Heating coils 78 energized from a current transformer 79 are utilized to actuate the bimetallic members 71 in accordance with the amount of load current flowing. These bimetallic members 77 may also be responsive to the temperature of oil in which the regulating windings are immersed by immersion in this same oil. An oil level has been indicated in Fig. 10.

If the current in the load circuit 38 exceeds a predetermined value for which the windings are designed, the adjustable members 76 will be moved so that the upturned ends 62 thereof tend to separate and move away from each other. Such action will decrease the range of the regulator and increase the maximum safe current value in the manner as described in connection with the manually adjustable structure.

If at the time adjustment of the members 76 takes place, the dial switch is then beyond the new range limiting position, back contacts 55 or 56 on the limit switches 53 or 54 are closed to return the regulator to a point within such range. For example, with the apparatus in the position shown in Fig. 10, a heating of the bimetallic members 77 will move the left hand member 76 so that the upturned end 62 thereof moves away from the right hand adjustable member. Such movement will cause the member 71 to move, in a counterclockwise direction as viewed in the drawing, about its pivot 72 thus actuating the contact 53 to open the circuit to the motor through the upper contact 51 of the primary relay 53. This action prevents the regulator from going in the "raise" direction.

Movement of the bimetallic member 76 as described above may decrease the range of regulation below the point corresponding to that at which the dial switch stands. If such is the case, the member 71 will be forced further in a counterclockwise direction until the switch 53 closes the contacts 56 thus energizing the motor 40 to run the regulator in a "lower" direction until the limit position of the new range is obtained, at which time the back contacts 56 will be opened. Similar back contacts 55 are provided for the limit switch 54 which operates at the other end of the voltage range. The dial switch, windings and control system for the regulator of Fig. 10 may otherwise be the same as that shown in Fig. 1.

The invention has been illustrated by means of a so-called step regulator in which a series winding 36 is tapped and of which the number of turns, added or subtracted to or from the voltage of supply 39, is varied. The windings 35 and 36 are as well illustrative of the windings of a so-called induction regulator, one winding of which is connected across the circuit and the other winding of which is connected in series with the circuit and the inductive relation between the two windings varied to obtain the desired regulation.

Although but several embodiments of the present invention have been illustrated and described, it will be apparent to those skilled in the art that various modifications and changes may be made therein without departing from the spirit of the invention or from the scope of the appended claims.

It is claimed and desired to secure by Letters Patent:

1. In combination, a supply circuit, a load circuit connected to said supply circuit, electroresponsive means for regulating the voltage of said load circuit to a predetermined value independent of variations of the voltage of said supply circuit within a predetermined range, said regulating means having a maximum safe current value, means for limiting operation of said regulating means, and means for varying said limiting means whereby said maximum safe current value and said range of variation are varied in relatively small increments.

2. In combination, a supply circuit, a load circuit connected to said supply circuit, electroresponsive means for regulating the voltage of said load circuit to a predetermined value independent of variations of the voltage of said supply circuit within a predetermined range, said regulating means having a maximum safe current value, and means operatively responsive to the current in one of said circuits for increasing said maximum safe current value.

3. In combination, a supply circuit, a load circuit connected to said supply circuit, electroresponsive means for regulating the voltage of said load circuit to a predetermined value independent of variations of the voltage of said supply circuit within a predetermined range, said regulating means having a maximum safe current value, and means operatively responsive to the current in said load circuit for increasing said maximum safe current value.

4. In combination, a supply circuit, a load circuit connected to said supply circuit, electroresponsive means for regulating the voltage of said load circuit to a predetermined value independent of variations of the voltage of said supply circuit within a predetermined range, said regulating means comprising a winding having a maximum safe current value, and means operatively responsive to the temperature of said winding for increasing said maximum safe current value.

5. In combination, a supply circuit, a load circuit connected to said supply circuit, electroresponsive means for regulating the voltage of said load circuit to a predetermined value independent of variations of the voltage of said supply circuit within a predetermined range, said regulating means comprising a winding immersed in insulating fluid, said winding having a maximum safe current value, and means operatively responsive to the temperature of said fluid for increasing said maximum safe current value.

6. In combination, a supply circuit, a load circuit connected to said supply circuit, electroresponsive means for regulating the voltage of said load circuit to a predetermined value independent of variations of the voltage of said supply circuit within a predetermined range, said regulating means comprising a winding immersed in insulating fluid, said winding having a maximum safe current value, and means operatively responsive to the temperature of said fluid and the current in one of said circuits for increasing said maximum safe current value.

7. In a control system for regulating the voltage of a load circuit to a predetermined value independent of variation of the voltage of a supply circuit, a primary relay responsive to the voltage of said load circuit, means responsive to operation of said primary relay for varying the voltage of said load circuit relative to the voltage of said supply circuit, said means comprising a winding having a maximum safe current value, means for limiting the range of operation of said voltage varying means, and means remote from said winding for adjusting said range limiting means while maintaining said regulator operatively connected to said load and supply circuits whereby the maximum safe current value of said winding is varied without removing said regulator from service.

8. In a control system for regulating the voltage of a load circuit to a predetermined value independent of variation of the voltage of a supply circuit, a primary relay responsive to the voltage of said load circuit, means responsive to operation of said primary relay for varying the voltage of said load circuit relative to the voltage of said supply circuit, said means comprising a winding having a maximum safe current value, means for limiting the range of operation of said voltage varying means, and means for adjusting said range limiting means whereby the maximum safe current value of said winding is varied, and means for indicating the maximum safe current value of said winding.

9. In a control system for regulating the voltage of a load circuit to a predetermined value independent of variation of the voltage of a supply circuit, a primary relay responsive to the voltage of said load circuit, means responsive to operation of said primary relay for varying the voltage of said load circuit relative to the voltage of said supply circuit, said means comprising a winding having a maximum safe current value, means for limiting the range of operation of said voltage varying means, and means for adjusting said range limiting means whereby the maximum safe current value of said winding is varied, and means for indicating said range of operation of said voltage varying means.

10. In a control system for regulating the voltage of a load circuit to a predetermined value independent of variation of the voltage of a supply circuit, a primary relay responsive to the voltage of said load circuit, means responsive to operation of said primary relay for varying the voltage of said load circuit relative to the voltage of said supply circuit, said means comprising a winding having a maximum safe current value, means for limiting the range of operation of said voltage varying means, and means for adjusting said range limiting means whereby the maximum safe current value of said winding is varied, and means for indicating said range and said maximum safe current value.

11. In a voltage regulator, two inductively related windings, means for varying the operative relation of said windings to regulate the voltage of a circuit, said means comprising a motor, a limit switch in circuit with said motor, and means responsive to an overload condition of one of said windings for adjusting the operation of said switch.

12. In a control system for regulating the voltage of a load circuit to a predetermined value independent of variation of the voltage of a supply circuit, a primary relay responsive to the voltage of said load circuit, means responsive to operation of said primary relay for varying the voltage of said load circuit relative to the voltage of said supply circuit, said means comprising a winding having a maximum safe current value, means for limiting the range of operation of said voltage varying means, and means responsive to an overload condition of said winding for adjusting said range limiting means.

13. In a control system for regulating the voltage of a load circuit to a predetermined value independent of variation of the voltage of a supply circuit, two inductively related windings one of which is connected to be energized from said supply circuit and the other of which is connected to add or subtract a voltage to or from said load circuit, means for varying said added or subtracted voltage, means for limiting the range of operation of said varying means, and means for adjusting said limiting means to vary the maximum safe current value of said windings in increments corresponding to increments of the order of one to five per cent of said load circuit voltage.

LELAND H. HILL.